Jan. 15, 1963　　　D. C. CHERRINGTON　　　3,073,333
TIGHT FILL SYSTEM FOR TANK LOADING AND DISCHARGING
Filed June 22, 1960　　　　　　　　　　　　3 Sheets-Sheet 1

Dean C. Cherrington　Inventor

By

Patent Attorney

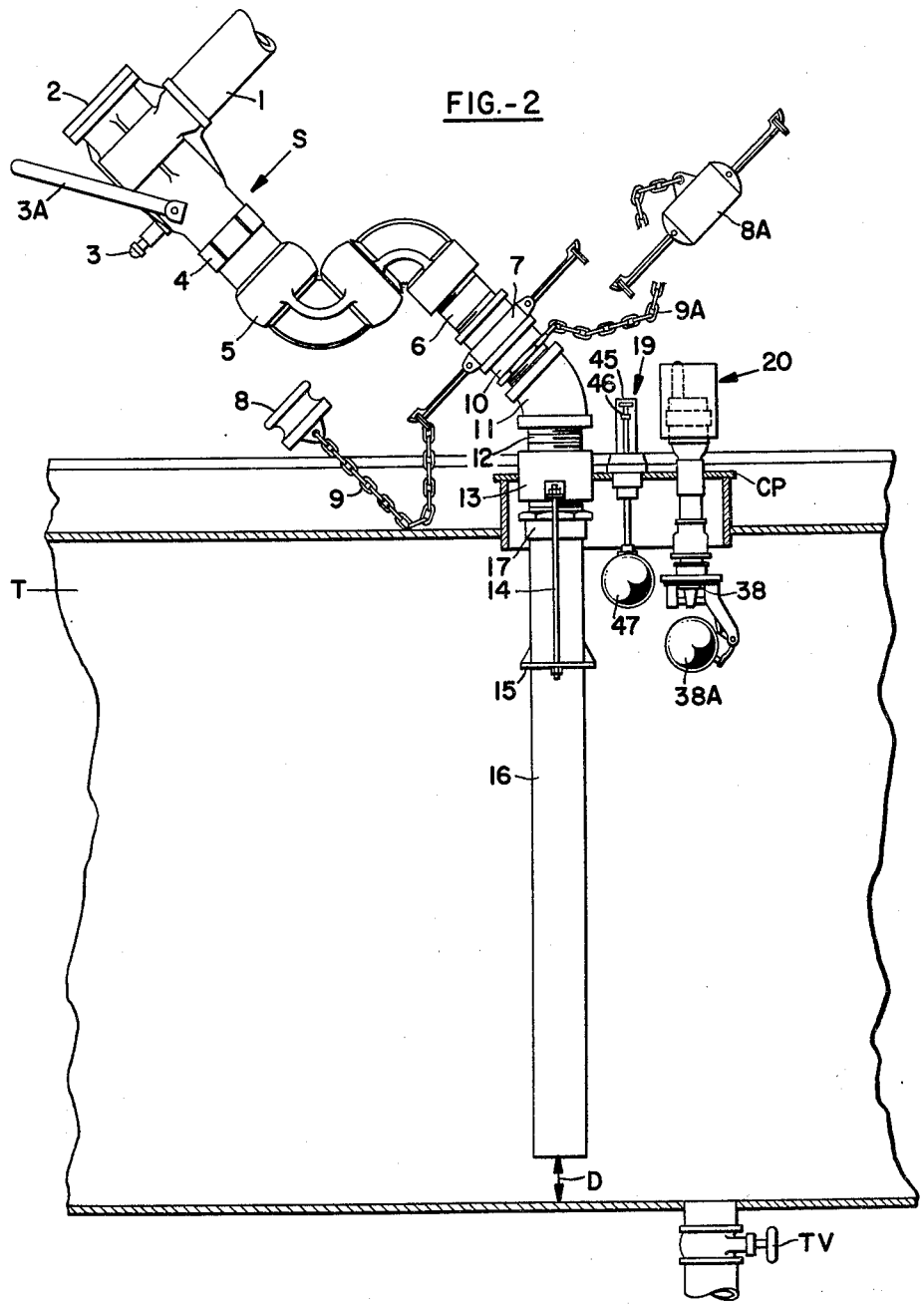

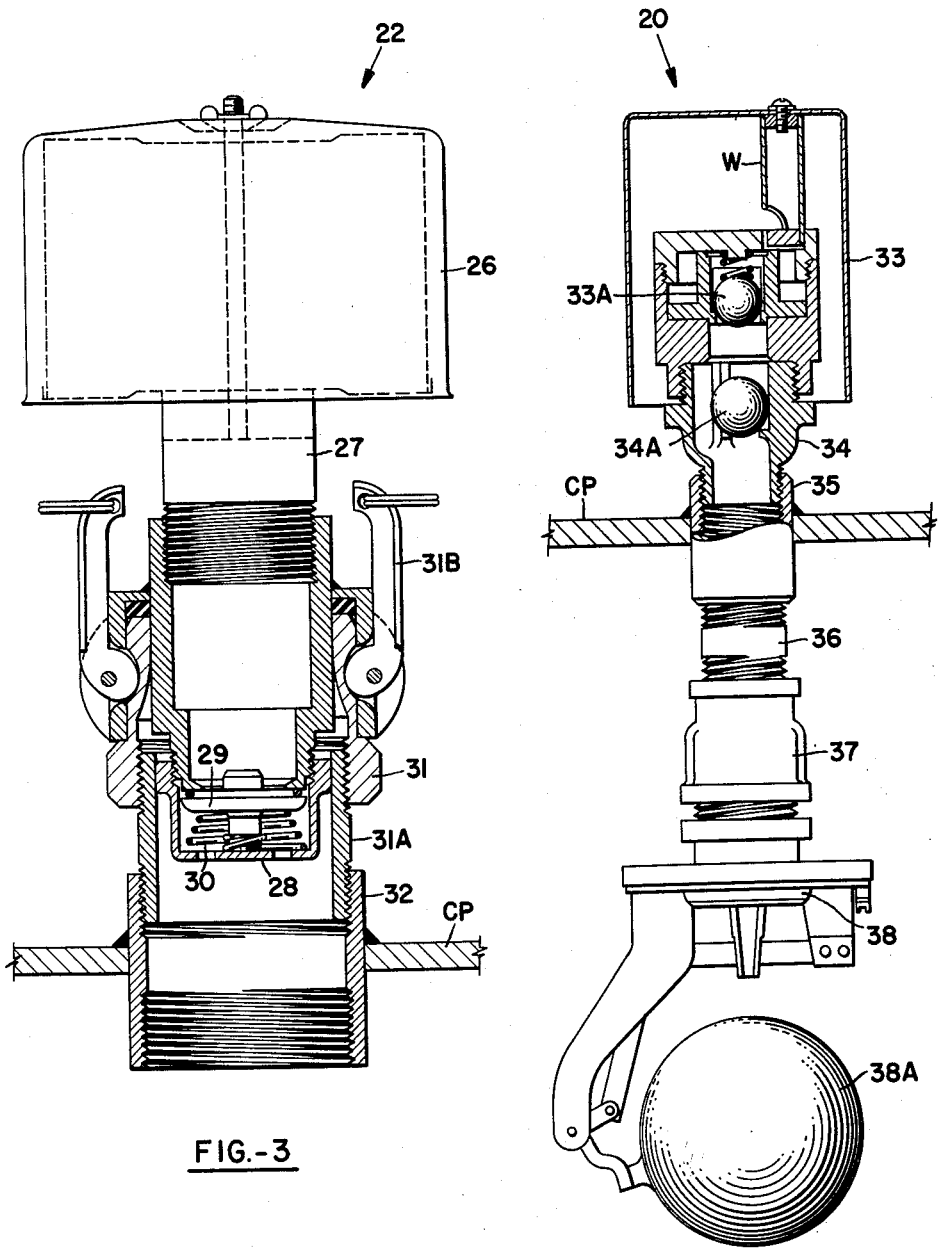

United States Patent Office 3,073,333
Patented Jan. 15, 1963

3,073,333
TIGHT FILL SYSTEM FOR TANK LOADING
AND DISCHARGING
Dean C. Cherrington, Westfield, N.J., assignor to Esso
Research and Engineering Company, a corporation of
Delaware
Filed June 22, 1960, Ser. No. 37,875
1 Claim. (Cl. 137—202)

The present invention relates to a tight-fill system for tank truck loading and discharging. It pertains more particularly to a system for preventing the entrance of dust, moisture and other extraneous matter into fuelling tanks, such as those which are mounted on trucks, for the transportation of hydrocarbon fuels such as gasoline, turbo fuels, middle distillate fuels, and the like.

This invention may be used with any of the hydrocarbon fuels and related materials, but is particularly useful in the loading and discharging or airplane turbo fuels and the like which can seriously damage jet engines if even minute quantities of solid contamination are permitted to be present in the turbo fuel. Because turbo fuel is also subject to the ready generation of static electricity, together with the associated possibility of vapour ignition, the tight-fill system controls the vapour discharge and normally makes it too rich to ignite. One other feature is that by controlling the outflow of hydrocarbon vapour, the operator is not required to breathe in vapours as is the case with open dome loading and thereby his health is protected.

Numerous systems have been devised in the prior art for handling flammable hydrocarbons in tank trucks and the like, and various attempts have been made to devise systems which will prevent over-filling and also prevent the introduction of moisture, dust and other impurities into the fuel tank or the equipment to be serviced thereby. Various systems of remote control for opening and closing air inlets and outlets in co-ordination with the introduction or withdrawal of fuel have been proposed. However, most of these have been quite complex and have involved extensive linkages and also mechanical, electrical or hydraulic operating actions involving considerable complexity and expense.

It is a particular object of the present invention to devise a "tight-fill" loading system which is extremely simple and semi-automatic in its operation, and which requires a minimum modification of the normal tank truck compartment and loading rack equipment.

Further objects will be evident as a detailed description of a preferred form of the invention is given, and this will be done by reference to the attached drawing wherein:

FIG. 1 is a plan view and FIG. 2 is a vertical section taken along the line A—A of FIG. 1;

FIGS. 3, 4 and 5 are vertical sectional views, considerably enlarged, taken respectively along the lines B—B, C—C, and D—D of FIG. 1.

Figure 1:
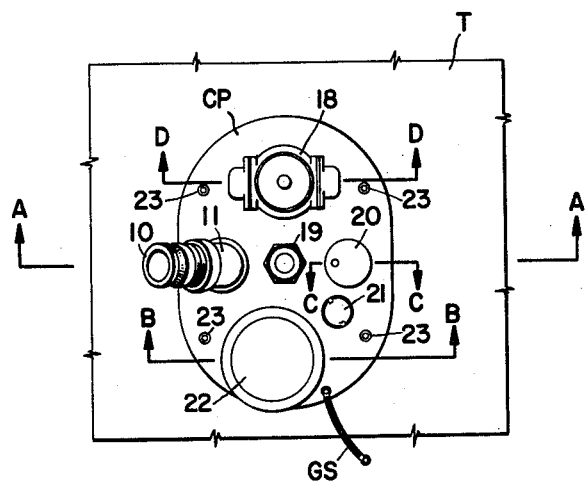

Referring first to FIGS. 1 and 2, there are shown essentially the complete components for the "tight-fill" system. A filling spout designated generally at S, comprises a connecting line 1 adapted to be connected to a source of supply for filling the tank T. This connects to loading valve 2, equipped with a small vacuum-breaker valve 3 having an operating lever 3A. A coupling 4 connects valve 2 to a double swivel adapter 5, attached through nipple 6 to a quick release coupler 7. The latter is provided with a plug 8 and a dust cap 8A. Chains 9 and 9A hold these parts against loss or misplacement when they are not in use.

Coupler 7 attaches in a well known manner to adapter 10 which, in turn, is secured to an elbow 11, attached by nipple 12 to a coupling 13 rigidly attached to a cover plate CP, which is fitted into the upper wall of the tank T.

The coupling member 13 is provided with a pair of ears through which bolts or studs 14 are passed to connect with annular flange member 15 welded to the drop pipe 16. These reinforce the drop pipe against forces which might tend to break it off when the tank is in motion. The upper end of the drop pipe is fastened to coupling member 13 by means of a union 17.

The loading rack filling connections, 1 to 9 inclusive, described above, include the double acting swing joint 5 which permits a quick-coupling type of connection to be made between the loading device and the tight-fill compartment, regardless of the position of the fill opening. Also, the quick-connecting coupling 7 provides a completely vapour and liquid-tight connection which prevents the outflow of liquid or the inflow of air during the product filling operation.

The fill connection assembly comprising elements 10 to 17 inclusive, conducts the product to an entry point a small distance D (approximately 3 inches in one example) above the bottom of the tank truck compartment. The position of the exit for the product close to the bottom of the compartment, assures that most of the time the entry point will be submerged beneath the product surface. Submerged fill tends to decrease the amount of explosive vapour given off from any product, and thereby reduces its explosive possibility. It also reduces the turbulence of the product flowing in at high rates which, in turn, reduces the generation of static electricity. This static electricity generation is a phenomenon common to all hydrocarbons, and is particularly dangerous with certain products of medium boiling range, e.g., one commonly known as "Turbo Fuel 4."

The entire assembly consisting of cover plate CP, the filling line just described, and the vent, filter and whistle assemblies described below, sits on a gasket which in turn is mounted on a shoulder connected to the compartment. A fusible plug 21 is provided for pressure release in case of fire. The hold-down bolts 23 clamp under the shoulder to pull the assembly tight and make it completely vapour-tight so that no air can get into the tank, nor can any vapour or product get out of the tank once the bolts are drawn down into position. A grounding strap GS is provided to maintain electrical continuity between the truck frame and the tight-fill assembly because there is a non-conducting gasket between the two units.

Figure 5:
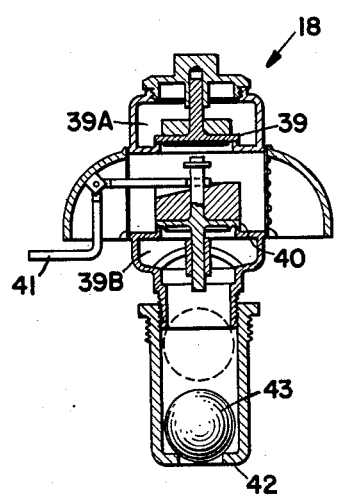

The cover plate CP supports the vent valve assembly shown generally at 18, FIG. 1, and in detail in FIG. 5, as well as the filter unit 22 and the whistle unit 20. These latter are shown in detail in FIGS. 3 and 4, respectively.

Basically, the complete tight-fill system consists of two separate and distinct phases and equipment therefor: (1) The product loading operation, and (2) the product discharging operation. These will be described as follows:

The Product Loading Operation (a) A means of dispensing fuel to the tight-fill tank compartment shown by the elements 1 to 9, already described.

(b) A fill line on the tight-fill assembly consisting of elements 10 to 17 inclusive.

(c) A means of withdrawing product from the tank either by gravity or by pump, as shown in the bottom of the oval tank section as tank valve TV.

(d) Means for venting air or gas from the tank as it is filled. Because the system is tightly enclosed, it is necessary to eliminate the displaced air when product flows in.

Therefore, a combination presure-vacuum vent assembly 18 (see also FIG. 5) is included for this purpose.

(e) A signal must be given to know when product is flowing into the tank, and this is accomplished by means of the whistle vent assembly 20, FIG. 4.

(f) As the tank approaches nearly full condition, it is also necessary to know more precisely how it stands and to know exactly when it is completely full. To cover this function, in addition to a combination ball float and shut-off valve assembly 38 attached to the bottom of the whistle to close it off when the compartment is almost full, a second unit is provided in the form of a gauge 19, FIGS. 1 and 2, to give a visual level reading when the tank truck compartment reaches the completely full position. The operator then closes the filling valve 2 and disconnects the quick-coupling assembly 7, 10, then replacing the dust cap 8A. This completes the filling operation.

(g) After the compartment has been filled, it is necessary to dispose of fuel in the line above connection 7, 10. Because it is a tight-fill system, the product between the valve 2 and the inlet connection 10 is trapped and must be allowed to drop into the tank before the loader is disconnected from the tank tight-fill equipment; otherwise, spillage and fire hazard would result. Means are provided in the valve assembly of FIG. 5 for this purpose. By depressing a lever 41 attached to the pressure pallet 40, the latter is raised and permits the pressure remaining in the small vapour space to be released. The weight of the trapped product in line 2, 5, 6 starts to drop and begins to create a vacuum in the connector 4 which causes the vacuum-breaker 3 to open so that all the trapped product drops into the tank. This operation takes about two seconds and permits a disconnect to be made without danger of a product spill.

*The Product Discharging Operation*

(a) The tank valve in the bottom of the tank compartment is opened and the product flows either by means of pumping or gravity to another container.

(b) As the product level in the tank or compartment drops, air must be permitted to enter the tank to displace the liquid volume withdrawn. Otherwise, a vacuum would be created as the product is dropped.

(c) It is the aim to protect against any contamination being permitted to enter with this air and the system contains an air filter assembly 22 through which all air entering the compartment is filtered to remove solid contamination. This is described below in connection with FIG. 3.

(d) Under normal circumstances, the air filter assembly is sufficient in size to permit all the normal air requirements during the product discharging operation. Its purpose is to filter the incoming air and to prevent a vacuum building up inside the compartment and collapsing it.

(e) Because it is always possible that the air filter may become plugged with dirt or that the check valve may freeze shut, an emergency air vacuum vent is provided. A vacuum release pallet 39 is provided in the pressure vacuum vent, and is weighted so that under normal operating conditions it does not open. It serves merely as a precautionary safety device that will operate on excess vacuum conditions only, and will prevent inward collapse of the tank. When pallet 39 is raised, inflowing air passes into space 39A which connects with passage 39B, bypassing the valve or pallet 40.

*Operation of Whistle Vent Assembly, FIG. 4*

When product is being pumped into the tank or compartment T, air is naturally displaced by the incoming product and must be released. This operation is accomplished automatically by means of the pressure-vacuum vent, FIG. 5, whose pressure pallet 40 is weighted so that sufficient air pressure is developed within the tank compartment to operate the whistle alarm 20, FIG. 4, before the vent 40 releases surplus air. Air flows upward through the float-operated valve 38, then through spacers 37, 36 and 35.

When the air reaches the spring-loaded check ball 33A in the top of assembly 33, it lifts it and flows through the whistle W, thereby causing it to operate. The purpose of the spring-loaded check assembly 33A is to prevent the back flow of unfiltered air into the compartment when product is being withdrawn from it. The ball 34A immediately below this check ball and contained in casing 34, provides roll-over protection in case the tank truck is overturned by an accident, and prevents the outflow of product in such cases. Elements 35, 36 and 37 are merely spacer pieces to permit the proper depth setting for the float valve mechanism. When the product reaches this point, it raises the float 38A and closes the valve 38 to shut off the whistle alarm, and to indicate that the product in the compartment is approaching the completely full position. It also serves a secondary purpose in that a certain internal pressure must be built up in the compartment to operate the whistle. If a tight sealing valve were not provided at this point, the internal pressure would push product up this assembly and allow it to flow out through the whistle. Such a spill would cause a fire hazard condition which could not be tolerated.

*Operation of the Pressure-Vacuum Vent Assembly, FIG. 5*

This assembly provides three separate and distinct functions in the system as follows:

(a) It automatically permits the escape of surplus air not required for operation of the whistle during the filling operation by means of the pressure pallet 40, as mentioned above.

(b) It automatically makes provision for emergency vacuum relief through the pallet 39, in case the normal air filter vent 22, for any reason fails to operate during the product discharging operation.

(c) The third function performed by this valve assembly 18 is to release the pressure in the compartment after filling is completed. As previously mentioned, when the filling has been completed, product will be trapped between the filling line valve 2 and the quick connector assembly 7 because this is a tight connection and no air is introduced into the system. Therefore, if this product were not removed before disconnecting elements 7 and 10, a spill would occur on the top of the tank truck. By depressing the lever 41 the normal pressure relief pallet 40 is raised, which permits the small air space inside the compartment above the product to relieve the built-up pressure of the system. As soon as this pressure becomes essentially atmospheric, the weight of the trapped product tends to push it into the compartment. The vacuum breaker 3 downstream of the filling line valve permits atmospheric pressure to enter behind this product, and causes it to drop into the compartment, thus clearing the complete loading assembly. Couplings 7 and 10 can then be disconnected with no fear of any spill occurring.

It will also be noted that there is a cage and ball assembly 42, 43 mounted directly beneath the pressure-vacuum vent assembly 18. Its purpose is to provide roll-over protection in case of an accident and will prevent the outflow of product through the pressure-vacuum vent should the truck compartment turn over.

*The Level Gauge Assembly 19*

This is essentially a plastic dome type of sight gauge 45 with an indicator device 46 connected to a slidable rod or shaft which terminates in a float ball 47 at the bottom end of the mechanism. After the whistle alarm has been shut off by its float valve, the product flow is reduced and as the level increases, it raises the float and shaft mechanism in this sight gauge assembly. As soon as the indicating marker on top of the shaft reaches a predetermined position, the compartment is considered to be completely full and the operator shuts off the valve. There is no direct connection between the inside of the compartment and outside air in this gauge and no roll-over protection is required. Also, it is prevented from physical damage by reason of its location in the midst of other equipment which stands higher.

The Air Filter Assembly 22, FIG. 3

Basically, this unit comprises an efficient air filter 26 mounted on conduit 27, to permit filtered air to flow to the inside of the compartment whenever product is being withdrawn from it. No air is permitted to enter the compartment by any other means except in an emergency, for example, in cases where this unit may become plugged due to dirt accumulation or freezing. The air check assembly is enclosed in cage 28 and comprises a check valve 29 normally held closed against its seat by spring 30. It is designed so that a small differential pressure caused by withdrawal of product opens it and permits the clean filtered air to flow in and displace the product in the tank. The upper unit comprising the filter and check valve is mounted by means of a quick release coupling 31 and nipple 31A on internally threaded coupler 32, welded into cover plate CP. Locking arms 31B secure the upper assembly to the support 31. A secondary purpose of the check valve 29 is to provide for the normal overturn protection required on any equipment mounted on a mobile refueller, and by means of the spring mechanism it prevents any air or product flowing out of the compartment.

The quick disconnect assembly is not necessary for the proper operation of the system, but it is useful in emergency. If for any reason any of the components of the system fail to operate, the whole system can be shut down and the levers 31B may be lifted and the whole vent assembly removed for a quick inspection of the product level within the compartment. It provides a convenient method of inspecting in case any of the components fail.

What is claimed is:

In a tight-fill system of the character described which includes a tank, means for filling said tank and means for discharging said tank, the combination which includes mounting means on the tank having:
(a) an audible signal device operable by outflowing air during tank filling, including means for preventing air inflow through said device, said device also including means for stopping air outflow when said tank is filled to a predetermined level;
(b) filter means adapted to cleanse air entering said tank during discharge; and
(c) a combination pressure vent-vacuum vent unit, which unit comprises a pressure relief valve and a vacuum relief valve connected to a common passageway into said tank, said pressure relief valve being biased so as to maintain signal operating pressure in said tank during filling and to relieve excessive pressure above signal requirements, and manually operable means for inactivating said pressure relief valve to reduce tank air pressure substantially to atmospheric, said vacuum relief valve being biased so as to normally block air inflow through said common passageway and thereby require inflowing air during tank discharge to pass through said filter means, said vacuum relief valve also being designed to open automatically when vacuum exceeds a predetermined maximum level.

References Cited in the file of this patent
UNITED STATES PATENTS

| | | |
|---|---|---|
| 1,628,069 | Schmidt | May 10, 1927 |
| 1,902,046 | Raines | Mar. 21, 1933 |
| 2,092,925 | Lithgow | Sept. 14, 1937 |
| 2,249,180 | Scully | July 15, 1941 |
| 2,502,525 | Krugler | Apr. 4, 1950 |
| 2,510,098 | Geisler | June 6, 1950 |